US012108320B2

(12) United States Patent
Fan et al.

(10) Patent No.: US 12,108,320 B2
(45) Date of Patent: Oct. 1, 2024

(54) CLUSTERING AND ROUTING METHOD AND SYSTEM FOR WIRELESS SENSOR NETWORKS

(71) Applicant: North China Electric Power University, Beijing (CN)

(72) Inventors: Bing Fan, Beijing (CN); Yanan Xin, Beijing (CN); Runze Wu, Beijing (CN)

(73) Assignee: North China Electric Power University, Beijing (CN)

( * ) Notice: Subject to any disclaimer, the term of this patent is extended or adjusted under 35 U.S.C. 154(b) by 377 days.

(21) Appl. No.: 17/559,708

(22) Filed: Dec. 22, 2021

(65) Prior Publication Data

US 2022/0369200 A1    Nov. 17, 2022

(30) Foreign Application Priority Data

Apr. 30, 2021  (CN) .......................... 202110481436.7

(51) Int. Cl.
| | |
|---|---|
| *H04W 56/00* | (2009.01) |
| *H04L 45/00* | (2022.01) |
| *H04L 45/48* | (2022.01) |
| *H04W 40/02* | (2009.01) |
| *H04W 40/24* | (2009.01) |
| *H04W 4/38* | (2018.01) |
| *H04W 84/18* | (2009.01) |

(52) U.S. Cl.
CPC .............. *H04W 40/02* (2013.01); *H04L 45/46* (2013.01); *H04L 45/48* (2013.01); *H04W 40/248* (2013.01); *H04W 4/38* (2018.02); *H04W 84/18* (2013.01)

(58) Field of Classification Search
CPC ..... H04W 40/02; H04W 40/248; H04W 4/38; H04W 84/18; H04L 45/46; H04L 45/48
USPC .......................................................... 370/392
See application file for complete search history.

(56) References Cited

U.S. PATENT DOCUMENTS

2020/0367133 A1* 11/2020 Matsuura .............. H04W 40/04

OTHER PUBLICATIONS

"Liu, WSN Clustering Method Routing on Bottle Sea Sheath Algorithm Optimization, Dec. 23, 2022, CN 112954763" (Year: 2021).*

(Continued)

*Primary Examiner* — Sai Ming Chan
(74) *Attorney, Agent, or Firm* — McDonnell Boehnen Hulbert & Berghoff LLP

(57) ABSTRACT

Disclosed are a clustering and routing method and system for a wireless sensor network. The method includes: constructing an initial MECPT; constructing cluster trees and updating MECPT; calculating clustering competition coefficients of existing cluster heads relative to nodes other than a base station; determining whether the clustering competition coefficients are all $-\infty$; if yes, enabling non-clustered nodes to communicate with the base station following paths in the initial MECPT, and selecting child nodes of the base station in the initial MECPT as relay nodes; calculating weights about energy consumption of communication between the cluster heads and the relay nodes to get communication paths between nodes and the base station; or if no, clustering nodes based on the clustering competition coefficients, and updating the MECPT and cluster trees to which the nodes are added by an iteration process.

8 Claims, 8 Drawing Sheets

(56) References Cited

OTHER PUBLICATIONS

"Huang, Method and System for Maximizing Wireless Charging Vehicle Utilization Rate Based on Multiple Threshold Values, May 14, 2021, CN 112803550" (Year: 2021).*
"Gao, A Synergism Campaign Based on Individual Wireless Self-organizing Network Communication Method, Apr. 26, 2019, CN 109688616" (Year: 2018).*

* cited by examiner

CLUSTERING AND ROUTING METHOD AND SYSTEM FOR WIRELESS SENSOR NETWORKS

CROSS REFERENCE TO RELATED APPLICATION

This patent application claims the benefit and priority of Chinese Patent Application No. 202110481436.7 filed on Apr. 30, 2021, the disclosure of which is incorporated by reference herein in its entirety as part of the present application.

TECHNICAL FIELD

The present disclosure relates to the field of wireless sensor networks, and in particular, to a clustering and routing method and system for wireless sensor networks.

BACKGROUND ART

With the development of the Internet of Things, wireless sensor networks, as one of the important communication technologies for data perception and acquisition, have been widely used because of its characteristics such as low-cost, self-organization, etc.

The wireless sensor network includes a large number of micro-size wireless sensors, and as a consequence, the micro-size results in constraints on the battery capacity of the sensors. In a variety of application scenarios, batteries cannot be replaced in time due to factors such as a wide distribution range of sensors and harsh environments. In view of this, energy becomes an important factor that limits the lifetime of wireless sensor networks.

Various energy routing strategies have been proposed to extend the lifetime of wireless sensor networks. For example, data fusion by cluster heads reduces the amount of transmitted data, but leads to early death of the cluster heads. In order to reduce the energy consumption of the cluster heads, a dual cluster heads scheme is proposed that allocates the energy consumption of data fusion and acquisition and data transmission to two nodes, but cluster heads responsible for data forwarding consumes energy too fast. A multi-hop communication between the cluster heads and a base station is adopted to reduce long-distance transmission in an attempt to reduce the energy consumption of data transmission, so as to save the energy consumption of the cluster heads and prolong the lifetime of the network. In this case, however, nodes close to the base station consume energy too fast, which causes the "energy hole".

SUMMARY

An object of the present disclosure is to provide a clustering and routing method and system for wireless sensor networks, to alleviate the problem of energy hole in existing wireless sensor networks.

To implement the above object, the present disclosure provides the following solutions:

A clustering and routing method for a wireless sensor network includes:
  acquiring, by a base station, node information in a wireless sensor network, and constructing an initial minimum-energy-consumption path tree (MECPT) based on the node information, where the node information includes node positions, node energy, and node IDs;
  calculating first cluster head competition coefficients of nodes other than the base station in the initial MECPT, performing a first batch of cluster head selection, node clustering and constructing a first batch of cluster trees, and updating the initial MECPT by a first iteration process, and getting the first-updated MECPT;
  calculating second cluster head competition coefficients of nodes other than the base station in the first-updated MECPT, performing a second batch of cluster head selection and node clustering, constructing a second batch of cluster trees and updating the first-updated MECPT by a second iteration process, and getting the second-updated MECPT;
  calculating, based on the first batch of cluster trees and the second batch of cluster trees, the clustering competition coefficients of existing cluster heads relative to nodes other than the base station in the second-updated MECPT;
  determining whether the clustering competition coefficients are all $-\infty$, to obtain a first determination result;
  if the first determination result indicates that the clustering competition coefficients are not all $-\infty$, clustering the nodes in the second-updated MECPT based on the clustering competition coefficients, and each time a node in the second-updated MECPT is clustered, updating the second-updated MECPT and the cluster tree to which the node in the second-updated MECPT is added, then back to the step "calculating, based on the first batch of cluster trees and the second batch of cluster trees";
  if the first determination result indicates that the clustering competition coefficients are all $-\infty$, enabling non-clustered nodes to communicate with the base station following the paths in the non-updated initial MECPT, and selecting the child nodes of the base station in the non-updated initial MECPT as the relay nodes;
  calculating weights about energy consumption of communication between the cluster heads and the relay nodes;
  calculating minimum weight paths from the cluster heads to the base station based on the weights, using the minimum weight paths as communication paths between the cluster heads and the base station, and determining communication paths between the nodes and the base station based on the communication paths between the cluster heads and the base station; and
  getting communication paths between all of nodes and the base station, then all of nodes upload the node information to the base station following the communication paths between the nodes and the base station.

In an embodiment, the acquiring, by a base station, node information in a wireless sensor network, and constructing an initial MECPT based on the node information may specifically include:
  calculating weights of connecting edges between any two nodes based on the node information, to generate a first weight matrix of the connecting edges;
  calculating minimum weight communication paths from alive nodes to the base station based on the first weight matrix of the connecting edges; and
  using the next-hop node of the alive node as the parent node of an alive node based on the minimum weight communication path from the alive node to the base station, traverse all of nodes, to construct the initial MECPT with the base station as a root node.

In an embodiment, the calculating the first cluster head competition coefficients of nodes other than the base station in the initial MECPT, performing a first batch of cluster head selection and node clustering, constructing a first batch of cluster trees and updating the initial MECPT by a first iteration process, and getting a first-updated MECPT. Every iteration may specifically include:

- selecting, as a cluster head, a node corresponding to a maximum first cluster head competition coefficient within a cluster head competition coefficient threshold range;
- using, as a cluster tree, a subtree with the cluster head as a root node, and retaining communication paths in the cluster tree; and
- deleting nodes in the cluster tree and edges associated with the nodes from the current initial MECPT, and getting the first-updated MECPT.

In an embodiment, after the deleting nodes in the first batch of cluster trees and edges associated with the nodes from the initial MECPT, and determining the first-updated MECPT, the method may further include:

- if the maximum first cluster head competition coefficient is less than a lower limit of the cluster head competition coefficient threshold range, the number of selected cluster heads does not reach a cluster head number threshold, and non-clustered nodes still exist in the wireless sensor network, performing "calculating second cluster head competition coefficients of nodes other than the base station in the first-updated MECPT, performing a second batch of cluster head selection, node clustering and constructing second batch of cluster trees and updating the first-updated MECPT by a second iteration process, and getting a second-updated MECPT";
- if the number of selected cluster heads exceeds the cluster head number threshold and a non-clustered node still exists in the wireless sensor network, performing "calculating, based on the first batch of cluster trees and the second batch of cluster trees, clustering competition coefficients of existing cluster heads relative to nodes other than the base station in the second-updated MECPT"; or
- if only the base station remains in the first-updated MECPT, performing "selecting child nodes of the base station in the non-updated initial MECPT as relay nodes".

In an embodiment, the calculating second cluster head competition coefficients of nodes other than the base station in the first-updated MECPT, performing a second batch of cluster head selection and node clustering, constructing a second batch of cluster trees, and updating the first-updated MECPT by a second iteration process, and getting a second-updated MECPT. Every iteration may specifically include:

- determining whether the second cluster head competition coefficients are all 0, to obtain a second determination result;
- if the second determination result indicates that not all of the second cluster head competition coefficients are 0, selecting, as the cluster head, a node corresponding to a maximum second cluster head competition coefficient in the second cluster head competition coefficients;
- using, as a cluster tree, a subtree with the cluster head as a root node, and retaining the communication paths in the cluster tree; and
- deleting nodes in the cluster tree and edges associated with the nodes from the current first-updated MECPT, and determining the second-updated MECPT, and updating the second cluster head competition coefficients then back to the step "determining whether the second cluster head competition coefficients are all 0";
- if the second determination result indicates that the second cluster head competition coefficients are all 0, performing "calculating, based on the first batch of cluster trees and the second batch of cluster trees, clustering competition coefficients of an existing cluster heads relative to nodes other than the base station in the second-updated MECPT".

In an embodiment, after the updating the current second-updated MECPT and cluster trees to which the node in the second-updated MECPT is added, the method may further include:

- obtaining an updated current MECPT; and
- if only the base station remains in the current MECPT, performing "selecting the child nodes of the base station in the non-updated initial MECPT as the relay nodes".

In an embodiment, the calculating the minimum weight paths from the cluster heads to the base station based on weights about energy consumption of communication, using the minimum weight paths as communication paths between the cluster heads and the base station, and getting communication paths between the nodes and the base station based on the communication paths between the cluster heads and the base station may specifically include:

- obtaining estimated load values of the cluster heads or the relay nodes in a current routing state corresponding to the difference between the non-updated MECPT and current MECPT;
- calculating weights of connecting edges established by any two nodes in the current MECPT based on the estimated load values, to generate a second weight matrix of the connecting edges, where the nodes are cluster heads, relay nodes and base station in the current MECPT; and
- calculating the minimum weight communication paths from cluster heads to the base station based on the second weight matrix of the connecting edges.

In an embodiment, after the determining that all nodes upload the node information to the base station following the communication paths between the nodes and the base station, the method may further include:

- determining whether there is a cluster head or relay node whose energy is lower than an energy threshold, to obtain a third determination result, where the energy threshold is 50% of remaining energy of the nodes that uploads the node information to the base station in a previous round of node information transmission, the nodes include cluster heads and relay nodes; and
- if the third determination result indicates that there is a cluster head or relay node whose energy is lower than the energy threshold, performing "acquiring, by a base station, node information in a wireless sensor network, and constructing an initial MECPT based on the node information"; or
- if the third determination result indicates that there is no cluster head or relay node whose energy is lower than the energy threshold, performing "communication following communication paths between the nodes and the base station in the previous round of node information transmission".

A clustering and routing system for a wireless sensor network includes:

- an initial MECPT construction module, configured to acquire, by a base station, node information in a wireless sensor network, and construct an initial MECPT based on the node information, where the node information includes node positions, node energy, and node IDs;

a first-updated MECPT determining module, configured to: calculate first cluster head competition coefficients of nodes other than the base station in the initial MECPT, perform a first batch of cluster head selection and node clustering, construct a first batch of cluster trees and update the initial MECPT by a first iteration process, and get a first-updated MECPT;

a second-updated MECPT determining module, configured to: calculate second cluster head competition coefficients of nodes other than the base station in the first-updated MECPT, perform a second batch of cluster head selection and node clustering, construct a second batch of cluster trees and update the first-updated MECPT by a second iteration process, and get a second-updated MECPT;

a clustering competition coefficient determining module, configured to calculate, based on the first batch of cluster trees and the second batch of cluster trees, clustering competition coefficients of the existing cluster heads relative to nodes other than the base station in the second-updated MECPT;

a first determining module, configured to determine whether the clustering competition coefficients are all $-\infty$, to obtain a first determination result;

a relay node selection module, configured to: if the first determination result indicates that the clustering competition coefficients are all $-\infty$, enable the non-clustered nodes to communicate with the base station following paths in non-updated the initial MECPT, and select the child nodes of the base station in the non-updated initial MECPT as relay nodes;

a weight about communication energy consumption calculation module, configured to calculate the weights about energy consumption of communication between the cluster heads and the relay nodes;

a module for determining the communication paths between nodes and the base station, configured to: calculate the minimum weight paths from the cluster heads to the base station based on the weights about energy consumption of communication, use the minimum weight paths as the communication paths between the cluster heads and the base station, and determine the communication paths between the nodes and the base station based on the communication paths between the cluster heads and the base station;

an upload module, configured to determine that all nodes upload the node information to the base station following the communication paths between the nodes and the base station.

an MECPT update module, configured to: if the first determination result indicates that the clustering competition coefficients are not all $-\infty$, cluster the nodes in the second-updated MECPT based on the clustering competition coefficients, and each time a node in the second-updated MECPT is clustered, update the second-updated MECPT and cluster tree to which the nodes in the second-updated MECPT is added.

In an embodiment, the initial MECPT construction module may specifically include:

a first weight matrix generation unit, configured to: calculate weights of the connecting edges established by any two nodes based on the node information to generate a first weight matrix of the connecting edges;

a minimum weight communication paths calculation unit, configured to calculate the minimum weight communication paths from the alive nodes to the base station based on the first weight matrix of the connecting edges; and an initial MECPT construction unit, configured to: use the next-hop nodes of the alive nodes as parent nodes of the alive nodes based on the minimum weight communication paths from the alive nodes to the base station, to construct the initial MECPT with the base station as a root node.

The present disclosure discloses the following technical effects based on the specific embodiments provided in the present disclosure: The present disclosure provides the clustering and routing method and system for a wireless sensor network, to construct clusters in batches based on the MECPT. Cluster heads selection and cluster trees construction are performed during planning of communication paths between of nodes in the clusters and the cluster heads, and cluster heads selected in different cluster heads selection stages cluster the non-clustered nodes based on the clustering status. In this way, energy consumption of nodes near the base station is balanced, and the problem of "energy hole" is alleviated.

BRIEF DESCRIPTION OF THE DRAWINGS

To describe the technical solutions in the embodiments of the present disclosure or in the prior art more clearly, the accompanying drawings required for the embodiments will be briefly described below. Apparently, the accompanying drawings described below are merely some embodiments of the present disclosure, and a common person skilled in the art may also obtain other accompanying drawings based on these accompanying drawings without creative efforts.

DETAILED DESCRIPTION OF THE EMBODIMENTS

The technical solutions of the embodiments of the present disclosure are clearly and completely described below with reference to the accompanying drawings. Apparently, the described embodiments are merely a part rather than all of the embodiments of the present disclosure. All other examples obtained by a person of ordinary skill in the art based on the examples of the present disclosure without creative efforts shall fall within the protection scope of the present disclosure.

The object of the present disclosure is to provide a clustering and routing method and system for a wireless sensor network capable of balancing energy consumption of nodes near a base station and alleviating the problem of "energy hole".

To make the above-mentioned objects, features, and advantages of the present disclosure clearer and more comprehensible, the present disclosure will be further described in detail below with reference to the accompanying drawings and the specific implementation.

Figure 1:
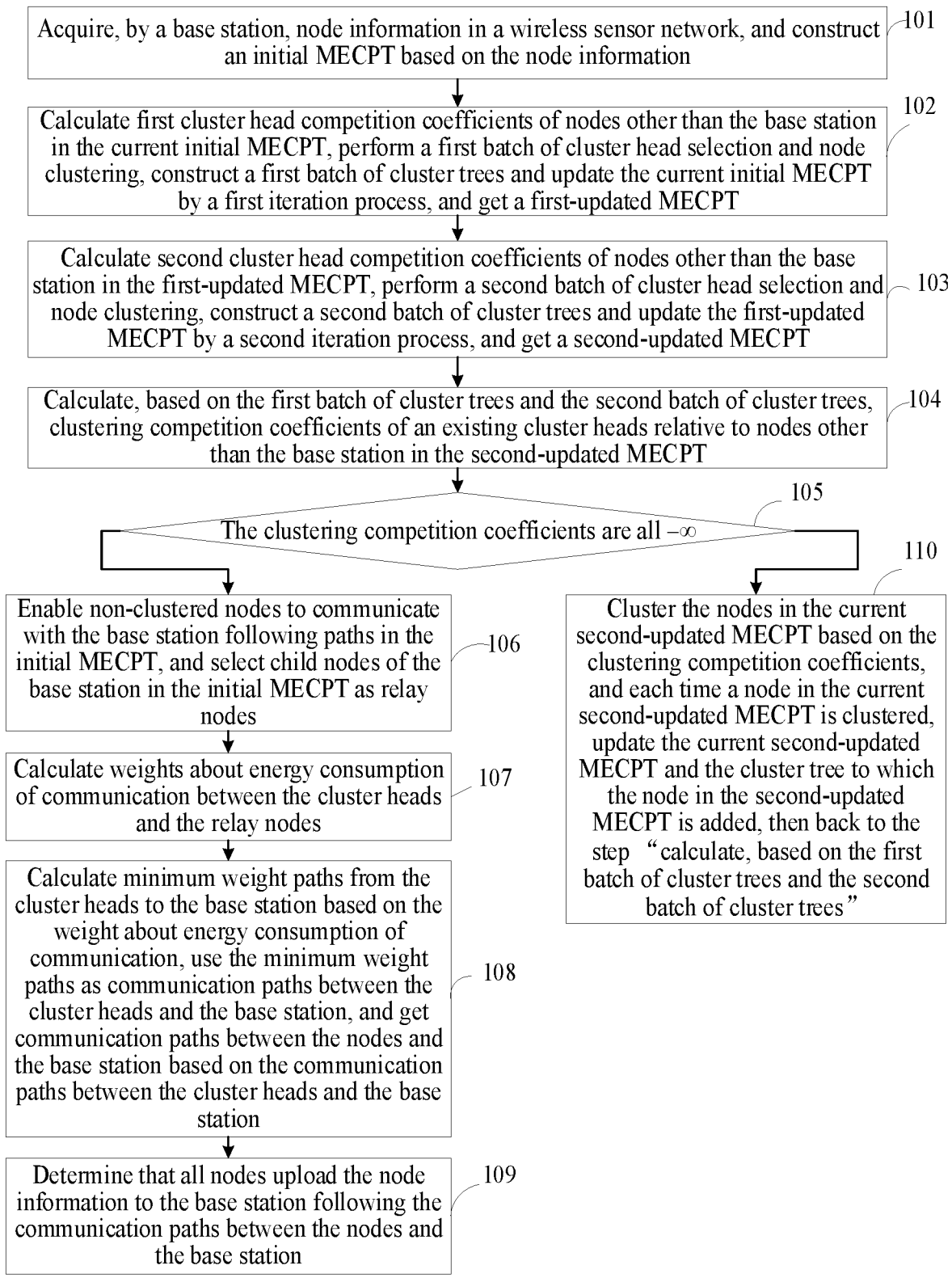
FIG. 1 is a flowchart of a clustering and routing method for a wireless sensor network according to the present disclosure.

FIG. 1 is a flowchart of a clustering and routing method for a wireless sensor network according to the present disclosure. As shown in FIG. 1, the clustering and routing method for a wireless sensor network includes the following steps.

In step 101, node information in a wireless sensor network is acquired by a base station, and an initial MECPT is constructed based on the node information, where the node information includes node positions, node energy, and node IDs.

The step 101 may specifically include: calculating weights of a connecting edges established by any two nodes based on the node information to generate a first weight matrix of the connecting edges; calculating a minimum weight communication paths from alive nodes to the base station based on the first weight matrix of the connecting edges; and using next-hop nodes of the alive nodes as parent nodes of the alive nodes based on the minimum weight communication paths from the alive nodes to the base station to construct the initial MECPT with the base station as a root node.

In step 102, first cluster head competition coefficients of nodes other than the base station in the initial MECPT are calculated, a first batch of cluster head selection and node clustering are performed, a first batch of cluster trees are constructed, the initial MECPT is updated by a first iteration process, and a first-updated MECPT is get.

The step 102 may specifically include: selecting, as a cluster head, a node corresponding to a maximum first cluster head competition coefficient within a cluster head competition coefficient threshold range; using, as a cluster tree, a subtree with the cluster head as a root node, and retaining communication paths in the cluster tree; and deleting nodes in the cluster tree and edges associated with the nodes from the current initial MECPT, and determining the first-updated MECPT.

After the deleting nodes in the first batch of cluster trees and edges associated with the nodes from the initial MECPT, and determining the first-updated MECPT, the method may further include the steps of:

Performing step 103 if the maximum first cluster head competition coefficient is less than a lower limit of the cluster head competition coefficient threshold range, a number of selected cluster heads does not reach a cluster head number threshold, and a non-clustered node still exists in the wireless sensor network;

Performing step 104 if a number of selected cluster heads exceeds the cluster head number threshold and a non-clustered node still exists in the wireless sensor network.

Performing step 106 if only the base station remains in the first-updated MECPT.

In step 103, second cluster head competition coefficients of nodes other than the base station in the first-updated MECPT are calculated, a second batch of cluster head selection and node clustering are performed, a second batch of cluster trees are constructed, the first-updated MECPT is updated by a second iteration process, and a second-updated MECPT is get.

Step 103 may specifically include: determining whether the second cluster head competition coefficients are all 0; if not, selecting, as the cluster head, a node corresponding to a maximum second cluster head competition coefficient in the second cluster head competition coefficients; using, as the cluster tree, a subtree with the cluster head as a root node, and retaining communication paths in the cluster tree; and deleting nodes in the cluster tree and edges associated with the nodes from the current first-updated MECPT, and determining the second-updated MECPT, and updating the second cluster head competition coefficients then back to the step "determining whether the second cluster head competition coefficients are all 0"; or is yes, performing step 104.

After the updating the second-updated MECPT and cluster trees to which the node in the second-updated MECPT is added, the method may further include: obtaining an updated current MECPT; and if only the base station remains in the current MECPT, performing "selecting the child nodes of the base station in the non-updated initial MECPT as relay nodes".

In step 104, clustering competition coefficients of an existing cluster head relative to nodes other than the base station in the second-updated MECPT are calculated based on the first batch of cluster trees and the second batch of cluster trees.

In step 105, it is determined whether the clustering competition coefficients are all $-\infty$; if yes, step 106 is performed; and if not, step 110 is performed.

In step 106, non-clustered nodes are enabled to communicate with the base station following paths in the non-updated initial MECPT, and child nodes of the base station in the non-updated initial MECPT may be selected as relay nodes.

In step 107, weights about energy consumption of communication between the cluster heads and the relay nodes are calculated.

In step 108, minimum weight paths from the cluster heads to the base station are calculated based on the weights about energy consumption of communication, the minimum weight paths are used as communication paths between the cluster heads and the base station, and the communication paths between the nodes and the base station are determined based on the communication paths between the cluster heads and the base station.

Step 108 may specifically include: obtaining estimated load values of the cluster heads or the relay nodes in a current routing state corresponding to the difference between the non-updated initial MECPT and current MECPT; calculating weights of connecting edges established by any two nodes in the current MECPT based on the estimated load values, to generate a second weight matrix of the connecting edges, where the nodes are cluster heads, relay nodes and base station in the current MECPT; and calculating the minimum weight communication paths from cluster heads to the base station based on the second weight matrix of the connecting edges.

In step 109, it is determined that all nodes upload the node information to the base station following the communication paths between the nodes and the base station.

After step 109, the method may further include: determining whether there is a cluster head and relay node whose energy is lower than an energy threshold, where the energy threshold is 50% of remaining energy of the nodes that uploads the node information to the base station in a previous round of node information transmission, the nodes include cluster heads and relay nodes; and if yes, performing step 101; or if not, performing communication following communication paths between the nodes and the base station in the previous round of node information transmission.

In step 110, the nodes in the second-updated MECPT are clustered based on the clustering competition coefficients, and each time a node in the second-updated MECPT is clustered, the second-updated MECPT and cluster tree to which the node in the second-updated MECPT is added are updated.

Figure 2:
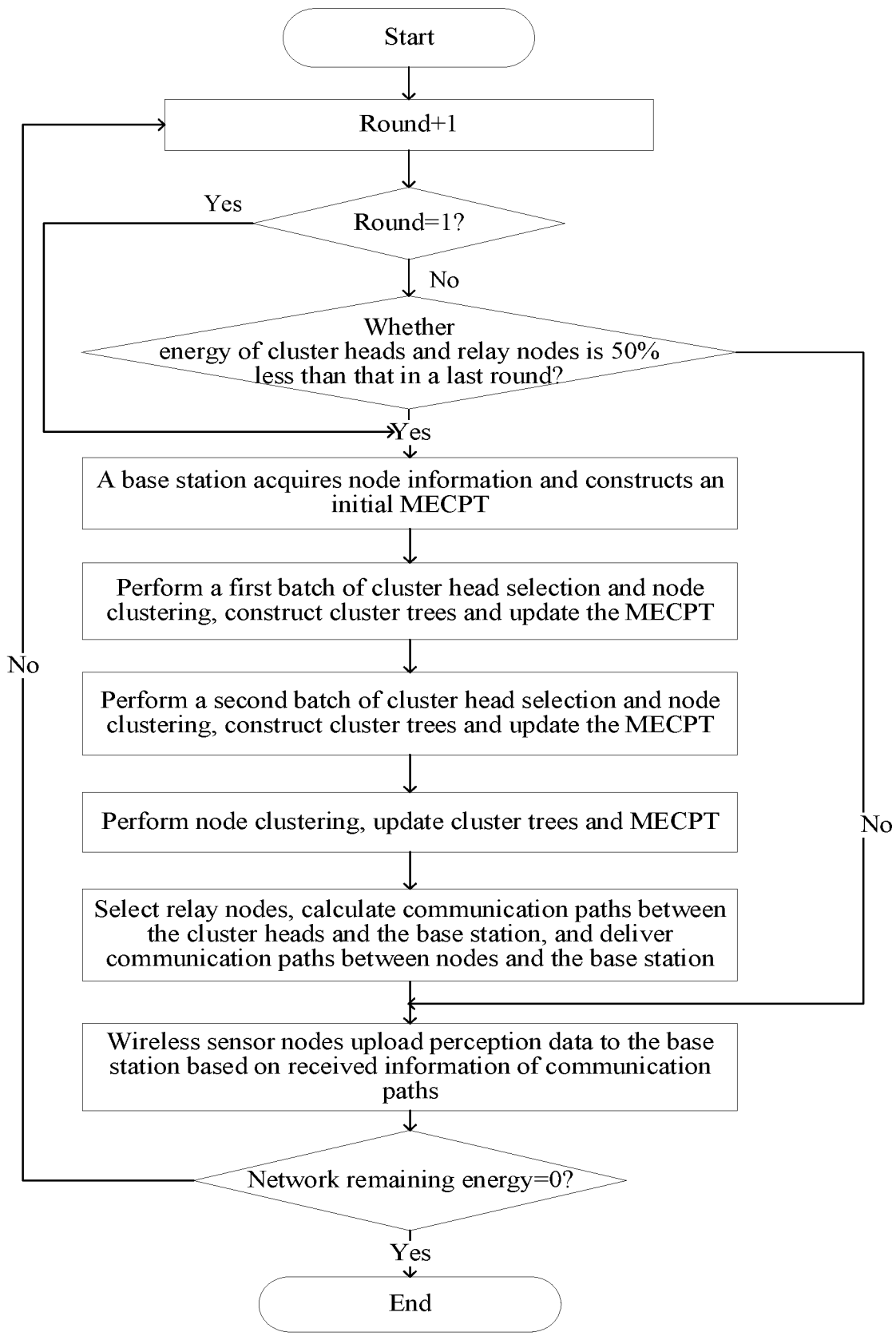
FIG. 2 is a flowchart of another clustering and routing method for a wireless sensor network according to the present disclosure.

Based on the clustering and routing method for a wireless sensor network according to the present disclosure, another optional cluster-based routing method for a wireless sensor network according to the present disclosure may specifically include the following steps as shown in FIG. 2.

In step S1: a base station acquires node information and the wireless sensor network is abstracted into a simple graph, where a wireless channel between any two nodes is abstracted as an edge with weight about energy consumption for unit data transmission, a path from each node to the base station is calculated through the Dijkstra algorithm, and an initial MECPT with the base station as a root node is constructed based on these paths.

In step S2, cluster head competition coefficients of the nodes are calculated based on the MECPT, a first batch of cluster head selection and node clustering are performed, a first batch of cluster trees are constructed and the current initial MECPT is updated by a first iteration process, where an updated initial MECPT is a first-updated MECPT. In the present disclosure, the MECPT and the cluster trees are always mutually exclusive, that is, the two do not contain a same vertex or edge.

In step S3: cluster head competition coefficients of nodes are calculated based on the current MECPT, a second batch of cluster head selection and node clustering are performed, a second batch of cluster trees are constructed and the current first-updated MECPT is updated by a second iteration process, where an updated first-updated MECPT is a second-updated MECPT, and each update of the MECPT is an update of the last MECPT.

In step S4, clustering competition coefficients of existing cluster heads relative to nodes other than the root node in the current MECPT are calculated based on the clustering trees constructed in step S2 and step S3; these nodes are clustered based on the clustering competition coefficients; each time a node is clustered, a current MECPT of the network and a cluster tree to which the node is added are updated; when the clustering competition coefficients of the nodes are all $-\infty$, paths between the nodes and the base station in the non-updated initial MECPT are used as communication paths between the nodes and the base station in the wireless sensor network; or when only the base station exists in the MECPT, this step is ended, proceeding to step S5.

In step S5, child nodes of the base station in the non-updated initial MECPT are selected as relay nodes; weights about energy consumption of communication between the cluster heads and the relay nodes are calculated, the weights about energy consumption are used as weights of edges between the two nodes, minimum weight paths from the cluster heads to the base station are calculated through the Dijkstra algorithm, and the minimum weight paths are used as the communication paths between the cluster heads and the base station.

In step S6, the nodes upload data to the base station following the obtained paths; at the beginning of a next round, if there is a cluster head or relay node whose energy is lower than an energy threshold $E_T(i)$ (50% of remaining energy of the node at the beginning of a previous round), returning to step S1; otherwise, all of the alive nodes continue to communicate with the base station following the paths in the previous round.

Further, step S1 may specifically include the following steps.

In step S11, the base station broadcasts a node information acquisition request to the nodes distributed in a monitoring area of the wireless sensor network; after receiving the request, the nodes send information such as node positions, node energy, and node IDs to the base station by using a flooding method.

In step S12, the base station calculates weights of connecting edges established by any two nodes based on the acquired node information to generate a first weight matrix W, where a calculation formula for a weight of an associated edge between a node i and a node j is:

$$w(i,j) = \begin{cases} 0.6(E_{elec} + \varepsilon_{mp} \times d(i,j)^4) + \dfrac{0.4E_{elec}}{E(j)} + \dfrac{0.6E_{elec}}{E(i)} + \\ \quad 0.4E_{elec} \times \text{packet}(j), \ d(i,j) \geq d_0, i \neq j \\ 0.6(E_{elec} + \varepsilon_{fs} \times d(i,j)^2) + \dfrac{0.4E_{elec}}{E(j)} + \dfrac{0.6E_{elec}}{E(i)} + \\ \quad 0.4E_{elec} \times \text{packet}(j), \ d(i,j) < d_0, i \neq j \end{cases}$$

A calculation formula for a weight of an associated edge between the node i and the base station BS is:

$$w(i,BS) = \begin{cases} 0.6(E_{elec} + \varepsilon_{mp} \times d(i,BS)^4) + \dfrac{0.4E_{elec}}{E(i)}, \ d(i,j) \geq d_0 \\ 0.6(E_{elec} + \varepsilon_{fs} \times d(i,BS)^4) + \dfrac{0.4E_{elec}}{E(i)}, \ d(i,j) < d_0 \end{cases}$$

The node i and the node j are both nodes whose remaining energy is greater than zero in the monitoring area of the current wireless sensor network, that is, alive nodes. When i=j, $w(i,j)=+\infty$. $E_{elec}$ is energy consumption for processing unit bit of data by a receiving circuit and a transmitting circuit. $\varepsilon_{mp}$ is an attenuation coefficient of a multi-path channel transmission model, and $\varepsilon_{fs}$ is an attenuation coefficient of a free channel transmission model. d(i,j) is a Euclidean distance between the node i and the node j, and d(i,BS) is a Euclidean distance between the node i and the base station BS. packet(i) is a predicted number of data packets that the node i needs to forward under a current routing result. $d_0$ is a distance threshold, which is calculated as follows:

$$d_0 = \sqrt{\dfrac{\varepsilon_{fs}}{\varepsilon_{mp}}}$$

In step S13, minimum weight paths from the alive nodes to the base station are calculated by using the Dijkstra algorithm based on the weight matrix w of the connecting edges obtained in step S12.

In step S14, next-hop nodes of nodes are used as parent nodes of the nodes based on the minimum weight paths obtained in step S13, and the initial MECPT with the base station as a root node is constructed according to this rule.

Figure 3:
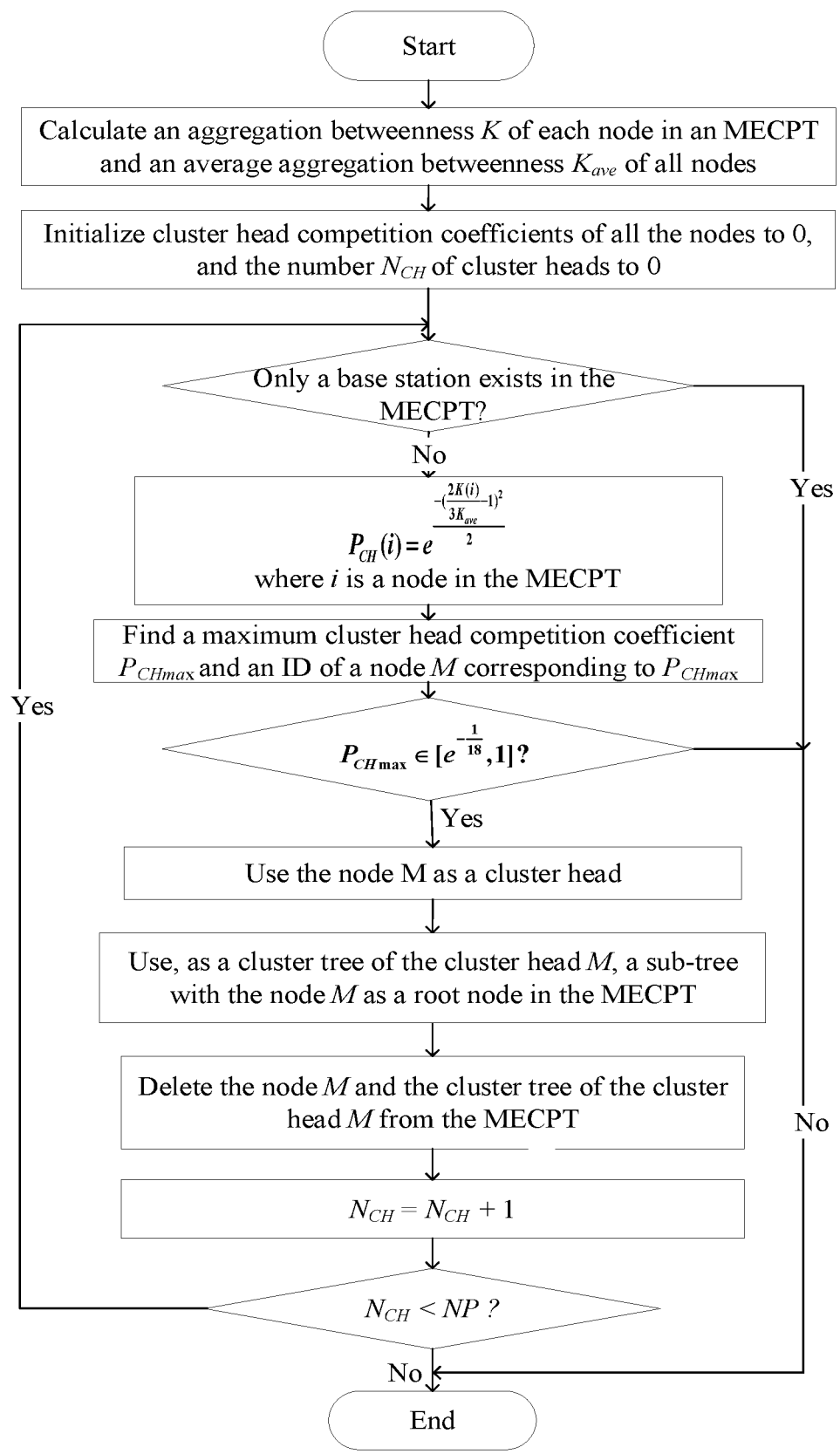
FIG. 3 is a flowchart of a method for a first batch of cluster heads selection, nodes clustering, cluster trees construction and MECPT update in FIG. 2.

In the present disclosure, as shown in FIG. 3, step S2 may specifically include the following steps.

In step S21, cluster head competition coefficients of nodes other than the base station in the current MECPT is calculated, where a calculation formula for a cluster head competition coefficient of the node i in this step is:

$$T_{CH}(i) = e^{\frac{-(N_{alive} \times P \times K(i)-1)^2}{2}}$$

K(i) is an aggregation betweenness of the node i, and is calculated as follows:

$$K(i) = \frac{M(i)}{N_{alive}}$$

M(i) is the number of nodes in a subtree with the node i as a root node in the current MECPT. $N_{alive}$ is the number of nodes with remaining energy greater than zero in the wireless sensor network, that is, the number of alive nodes in the network.

In step S22, a node corresponding to a maximum cluster head competition coefficient satisfying $$T_{CH}(i) \in \left[e^{-\frac{1}{18}}, 1\right]$$

is selected as a cluster head, and a subtree with this node as the root node in the current MECPT is taken as a cluster, which is called a cluster tree, and communication paths in the cluster tree are retained; if the maximum cluster head competition coefficient of the node in the current MECPT is less than $$e^{-\frac{1}{18}},$$

that is, there is no node satisfying the requirement, or the number of selected cluster heads reaches a specified cluster head number $N_{alive} \times P$ (P is the percentage of cluster heads), the first batch of cluster heads selection and nodes clustering are ended, and step S3 is performed; otherwise, step S23 is performed.

In step S23, nodes in the cluster trees obtained in step S22 and edges associated with the nodes deleted from the current MECPT, to obtain an updated MECPT, returning to step S21.

Figure 4:
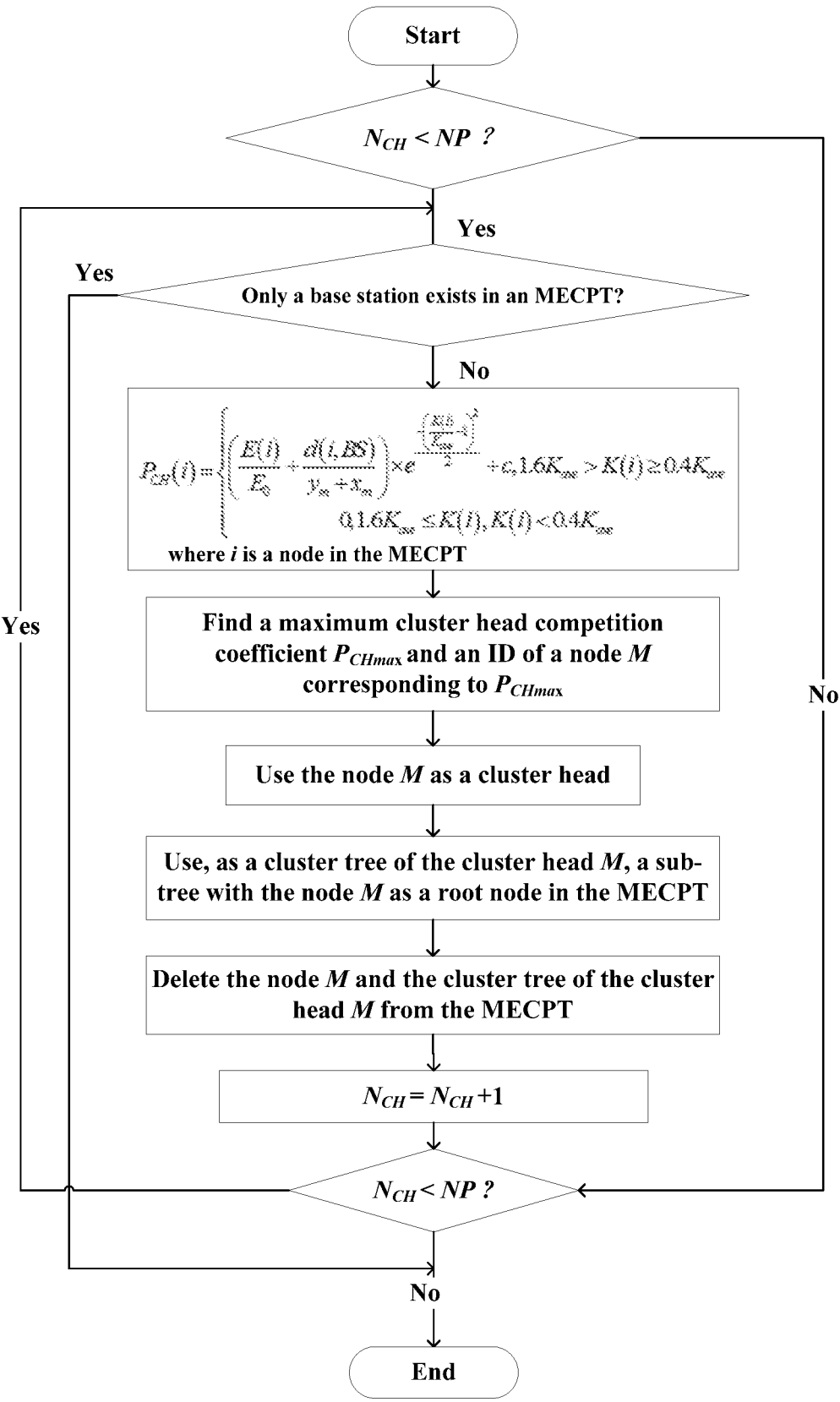
FIG. 4 is a flowchart of a method for a second batch of cluster heads selection, nodes clustering, cluster trees construction and MECPT update in FIG. 2.

In the present disclosure, as shown in FIG. 4, step S3 may further include the following specific steps.

In step S31, if the number of selected cluster heads is equal to or greater than $N_{alive} \times P$ and a non-clustered node still exists in the network, step S4 is performed; if only the base station remains in the current MECPT, step S5 is performed; otherwise, cluster head competition coefficients of nodes other than the base station in the current MECPT are calculated, where the calculation formula for the cluster head competition coefficient of the node i in step S3 is:

$$T_{CH}(i) = \begin{cases} \left(\frac{E(i)}{E_0} + \frac{d(i, BS)}{x_m + y_m}\right) \times e^{\frac{-(N_{alive} \times P \times K(i)-1)^2}{2}}, & \frac{1.6}{N_{alive} \times P} > K(i) \geq \frac{0.4}{N_{alive} \times P} \\ 0, & 1.6\frac{1.6}{N_{alive} \times P} \leq K(i) \text{ or } K(i) < \frac{0.4}{N_{alive} \times P} \end{cases}$$

Where E(i) is current remaining energy of the node i; $E_0$ is initial energy of the node; $x_m$ and $y_m$ are the width and length of a rectangular range of the wireless sensor network; d(i,BS) indicates a Euclidean distance between the node i and the base station.

In step S32, if the cluster head competition coefficients of the nodes in the current MECPT are all 0, the second batch of cluster heads selection is ended, proceeding to step S4; otherwise, a node corresponding to the maximum cluster head competition coefficient is selected as the cluster head, and a subtree with the node as the root node in the current MECPT is taken as a cluster tree, and communication paths in the cluster tree are retained, where nodes in the cluster tree form a cluster.

In step S33, the nodes in the cluster trees obtained in step S32 and edges associated with the nodes are removed from the current MECPT, to obtain an updated MECPT, returning to step S31.

Figure 5:
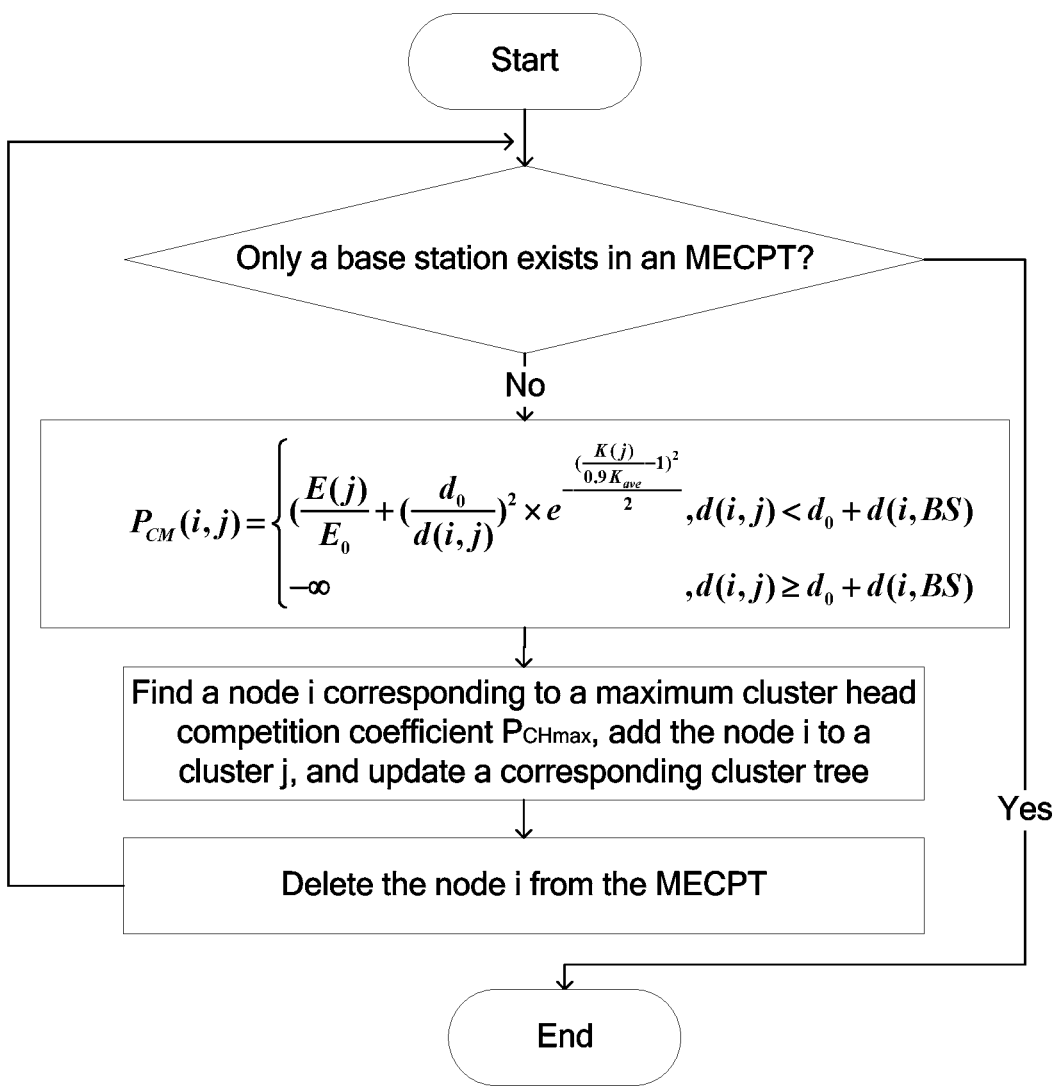
FIG. 5 is a flowchart of a method for nodes clustering, cluster trees update and MECPT update in FIG. 2.

In the present disclosure, as shown in FIG. 5, step S4 may specifically include the following steps.

In step S41, clustering competition coefficients of nodes other than the base station in the current MECPT are calculated, where a calculation formula for a clustering competition coefficient of the cluster head $CH_j$ relative to the node i is:

$$T_{CM}(i, CH_j) = \begin{cases} \left(\frac{E(CH_j)}{E_0} + \left(\frac{d_0}{d(i, CH_j)}\right)^2\right) \times e^{-\frac{\left(\frac{N_{alive} \times P \times K(CH_j)}{0.9}-1\right)^2}{2}}, & d(i, CH_j) < d_0 + d(i, BS) \\ -\infty, & d(i, CH_j) \geq d_0 + d(i, BS) \end{cases}$$

Where $E(CH_j)$ is current remaining energy of the cluster head $CH_j$; $d(i,CH_j)$ is a Euclidean distance from the node i to the cluster head $CH_j$; and $E_0$ is initial energy of the node.

In step S42, if the maximum clustering competition coefficient is $-\infty$, non-clustered nodes communicate with the base station following the paths in the initial MECPT, proceeding to step S5; otherwise, a node i corresponding to the maximum clustering competition coefficient is added to a cluster of the corresponding cluster head j, a node h nearest to the node i in the cluster tree in which the cluster head j is located is found, a direct communication path between the node i and the node h is established, where the node i communicates with the cluster head through the node h; in this case, the node i is removed from the current MECPT, and the MECPT is updated.

In step S43, if only the base station remains in the current MECPT, step S5 is performed; otherwise, returning to step S41.

Further, step S5 may specifically include the following steps.

In step S51, child nodes of the base station in the initial MECPT are selected as relay nodes.

In step S52, weights of an edge between any two nodes are calculated to obtain a weight matrix W, where a calculation formula for a weight of an edge between a cluster head $CH_i$ and a cluster head $CH_j$ is:

$$W(CH_i, CH_j) = \begin{cases} \frac{0.3\text{load}(CH_j) \times (E_{elec} + \varepsilon_{fs} \times d_0^2)}{E_0} + \frac{0.05(\text{load}(CH_i) + 1)E_{elec}}{E(CH_j)} + \frac{0.65(\text{load}(CH_i) + 1)(E_{elec} + \varepsilon_{mp} \times d(CH_i, CH_j)^4)}{E(CH_i)}, & d(CH_i, CH_j) \geq d_0 \\ \frac{0.3\text{load}(CH_j) \times (E_{elec} + \varepsilon_{fs} \times d_0^2)}{E_0} + \frac{0.05(\text{load}(CH_i) + 1)E_{elec}}{E(CH_j)} + \frac{0.65(\text{load}(CH_i) + 1)(E_{elec} + \varepsilon_{mp} \times d(CH_i, CH_j)^4)}{E(CH_i)}, & d(CH_i, CH_j) < d_0 \end{cases}$$

A calculation formula for a weight of an edge between the cluster head $CH_i$ and the relay node $RE_j$ is:

$$W(CH_i, RE_j) = \begin{cases} \frac{0.3\text{load}(RE_j) \times (E_{elec} + \varepsilon_{fs} \times d_0^2)}{E_0} + \frac{0.05(\text{load}(CH_i) + 1)E_{elec}}{E(RE_j)} + \frac{0.65(\text{load}(CH_i) + 1)(E_{elec} + \varepsilon_{mp} \times d(CH_i, RE_j)^4)}{E(CH_i)}, & d(CH_i, RE_j) \geq d_0 \\ \frac{0.3\text{load}(RE_j) \times (E_{elec} + \varepsilon_{fs} \times d_0^2)}{E_0} + \frac{0.05(\text{load}(CH_i) + 1)E_{elec}}{E(RE_j)} + \frac{0.65(\text{load}(CH_i) + 1)(E_{elec} + \varepsilon_{mp} \times d(CH_i, RE_j)^4)}{E(CH_i)}, & d(CH_i, RE_j) < d_0 \end{cases}$$

A calculation formula for a weight of an edge between the relay node $RE_j$ and the cluster head $CH_i$ is:

$$W(RE_j, CH_i) = \begin{cases} \frac{0.3\text{load}(CH_i) \times (E_{elec} + \varepsilon_{fs} \times d_0^2)}{E_0} + \frac{0.05(\text{load}(RE_j) + 1)E_{elec}}{E(CH_i)} + \frac{0.65(\text{load}(RE_j) + 1)(E_{elec} + \varepsilon_{mp} \times d(RE_j, CH_i)^4)}{E(RE_j)}, & d(RE_j, CH_i) \geq d_0 \\ \frac{0.3\text{load}(CH_i) \times (E_{elec} + \varepsilon_{fs} \times d_0^2)}{E_0} + \frac{0.05(\text{load}(RE_j) + 1)E_{elec}}{E(CH_i)} + \frac{0.65(\text{load}(RE_j) + 1)(E_{elec} + \varepsilon_{mp} \times d(RE_j, CH_i)^4)}{E(RE_j)}, & d(RE_j, CH_i) < d_0 \end{cases}$$

A calculation formula for a weight of an edge between the relay node $RE_i$ and a relay node $RE_j$ is:

$$W(RE_i, RE_j) = \begin{cases} \frac{0.3\text{load}(RE_j) \times (E_{elec} + \varepsilon_{fs} \times d_0^2)}{E_0} + \frac{0.05(\text{load}(RE_i) + 1)E_{elec}}{E(RE_j)} + \frac{0.65(\text{load}(RE_i) + 1)(E_{elec} + \varepsilon_{mp} \times d(RE_i, RE_j)^4)}{E(RE_i)}, & d(RE_i, RE_j) \geq d_0 \\ \frac{0.3\text{load}(RE_j) \times (E_{elec} + \varepsilon_{fs} \times d_0^2)}{E_0} + \frac{0.05(\text{load}(RE_i) + 1)E_{elec}}{E(RE_j)} + \frac{0.65(\text{load}(RE_i) + 1)(E_{elec} + \varepsilon_{mp} \times d(RE_i, RE_j)^4)}{E(RE_i)}, & d(RE_i, RE_j) < d_0 \end{cases}$$

A calculation formula for a weight of an edge between the cluster head $CH_i$ and the base station BS is:

$$W(CH_i, BS) = \begin{cases} \frac{0.65(\text{load}(CH_i) + 1) \times (E_{elec} + \varepsilon_{mp} \times d(CH_i, BS)^4)}{E(CH_i)}, & d(CH_i, BS) \geq d_0 \\ \frac{0.65(\text{load}(CH_i) + 1) \times (E_{elec} + \varepsilon_{fs} \times d(CH_i, BS)^2)}{E(CH_i)}, & d(CH_i, BS) < d_0 \end{cases}$$

A calculation formula for a weight of an edge between the relay node $RE_i$ and the base station BS is:

$$W(RE_i, BS) = \begin{cases} \dfrac{0.65(\text{load}(RE_i)+1) \times (E_{elec} + \varepsilon_{mp} \times d(RE_i, BS)^4)}{E(RE_i)}, & d(RE_i, BS) \geq d_0 \\ \dfrac{0.65(\text{load}(RE_i)+1) \times (E_{elec} + \varepsilon_{fs} \times d(RE_i, BS)^2)}{E(RE_i)}, & d(RE_i, BS) < d_0 \end{cases}$$

When i=j, w(i,j)=+∞. In the above formulas, load($CH_i$) and load($RE_i$) are respectively loads that the cluster head $CH_i$ or the relay node $RE_i$ may bear under a current routing situation.

In step S53, minimum weight communication paths from each cluster heads to the base station are obtained by using the Dijkstra algorithm based on the matrix W.

The technical solutions of the present disclosure will be further described below through specific embodiments.

As shown in Table 1, simulation parameters of the clustering and routing method for a wireless sensor network is given in Table 1. 100 nodes are randomly distributed in a monitoring area of the wireless sensor network, and the base station is located in the center of the monitoring area of the wireless sensor network.

TABLE 1

| Symbol | Meaning | Value |
| --- | --- | --- |
| $x_m \times y_m$ | Monitoring area | 500 m × 500 m |
| N | The number of sensor nodes | 100 |
| P | Percentage of cluster heads | 0.1 |
| $E_0$ | Initial energy of a node | 1.0 J |
| $E_{DA}$ | Energy consumption for fusing unit bit data by a node | 5 nJ/bit |
| $E_{elec}$ | Energy consumption for a transceiver circuit to process unit bit of data | 50 nJ/bit |
| $\varepsilon_{fs}$ | Attenuation coefficient of free space channel | 10 pJ/bit/m² |
| $\varepsilon_{mp}$ | Attenuation coefficient of multi-path transmission channel | 0.0013 pJ/bit/m⁴ |
| DM | Data packet length | 2,500 bit |
| CM | Control message length | 20 bit |
| $d_0$ | Distance threshold | $\sqrt{\dfrac{\varepsilon_{fs}}{\varepsilon_{mp}}}$ |

A calculation method for the energy consumption for transmitting and receiving m bit data is as follows:

Energy consumption for transmitting m bit data is:

$$E_{Tx}(l, d) = \begin{cases} m \times E_{elec} + m \times \varepsilon_{fs} \times d^2, & d < d_0 \\ m \times E_{elec} + m \times \varepsilon_{mp} \times d^4, & d \geq d_0 \end{cases}$$

Energy consumption for receiving m bit data is:

$$E_{Rx} = E_{elec} \times m$$

Energy consumption for fusing m bit data is:

$$E_a = E_{DA} \times m$$

Initialization of the network environment: 100 wireless sensor nodes are randomly and evenly distributed in a monitoring area of 500 m×500 m. Each wireless sensor node knows its own geographical position and has a unique ID; the base station is deployed in the middle of the monitoring area, with the coordinates (250, 250); the percentage P of cluster heads is 0.1.

MATLAB is used as a simulation tool, and system simulation environment parameters are set as follows:

a) 100 wireless sensor nodes are randomly and evenly distributed in an area of 500 m×500 m, with the abscissa range (0, 500) and the ordinate range (0, 500), and all the wireless sensor nodes are not mobile.

b) The base station is stationary, and its position is (250, 250).

c) Related parameter settings are shown in Table 1.

d) Each wireless sensor node can acquire a data packet with a data volume of 2,500 bits in each round.

e) The communication channel is in an ideal state without collisions.

f) Energy consumption is calculated in the manner described above.

The above parameters are not constant, and some parameters can be changed as needed for different simulation content.

Figure 6:
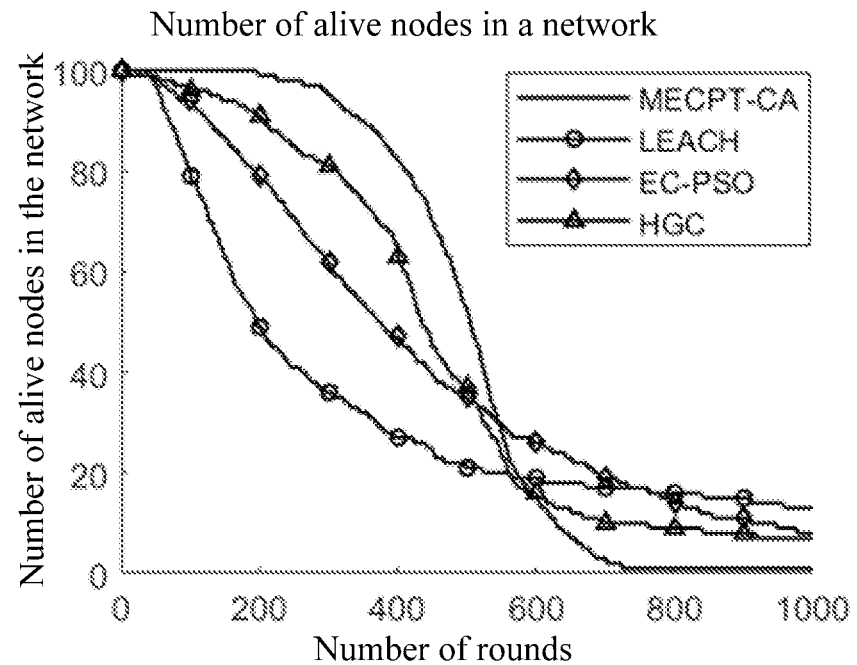
FIG. 6 is a schematic diagram of a relationship between a number of dead nodes and a number of rounds when a wireless sensor network runs for 1,000 rounds.

In order to analyze the improvement in performance of the wireless sensor network in the present disclosure, the method proposed in the present disclosure, LEACH proposed by Wendi Rabiner et al., HGC proposed by Jocelyn Edinio Zacko Gbadouissa et al., and EC-PSO proposed by Wang J et al. are simulated under equivalent simulation conditions, and the results shown in FIG. 6 to FIG. 9 are obtained. The simulation results are compared and analyzed as follows:

FIG. 6 is a schematic diagram of a relationship between the number of dead nodes and the number of rounds when the wireless sensor network runs for 1,000 rounds in the above environment. It can be learned that the cluster heads obtained through the batchwise cluster heads selection method in the present disclosure have a low centrality, such that less energy waste is generated, and the lifetime of the network can be extended. The nodes clustering method enables a reasonable scale of the generated clusters and achieves load balancing. Therefore, the death moments of the nodes are relatively concentrated, that is, the network energy consumption is relatively balanced. In addition, the wireless sensor network has more effective working rounds (when more than 60% of the nodes in the network die, a large number of packets are lost, which is considered as invalid working rounds).

Figure 7:
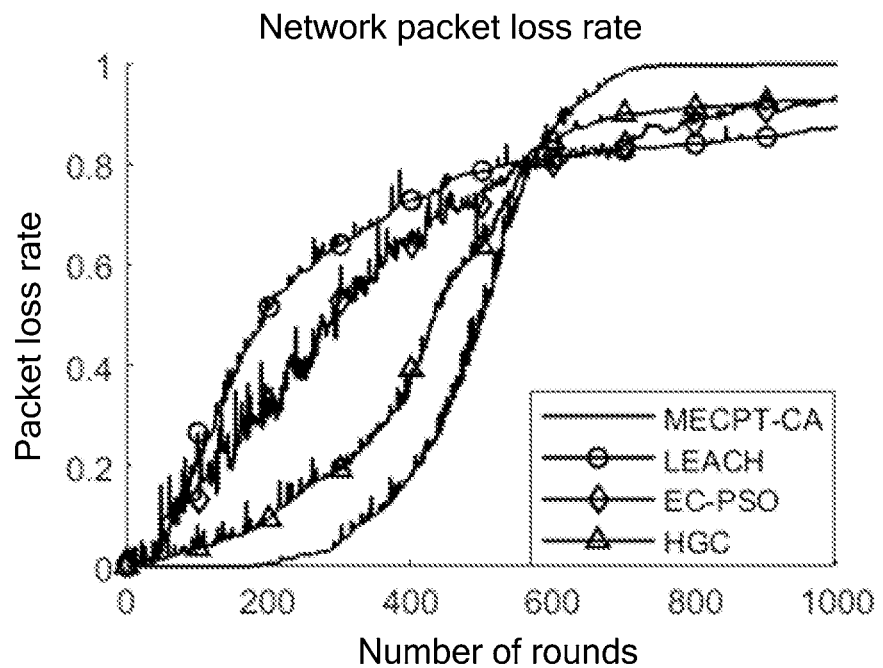
FIG. 7 is a schematic diagram of a relationship between a network packet loss rate and a number of rounds when a wireless sensor network runs for 1,000 rounds.

FIG. 7 is a schematic diagram of a relationship between a network packet loss rate and the number of rounds when the wireless sensor network runs for 1,000 rounds in the above environment. It can be learned that when the wireless sensor network is in the effective working rounds, the clustering and node clustering process adopted in the present disclosure considers the cluster scale and load balance, such that the packet loss rate of the network is small.

Figure 8:
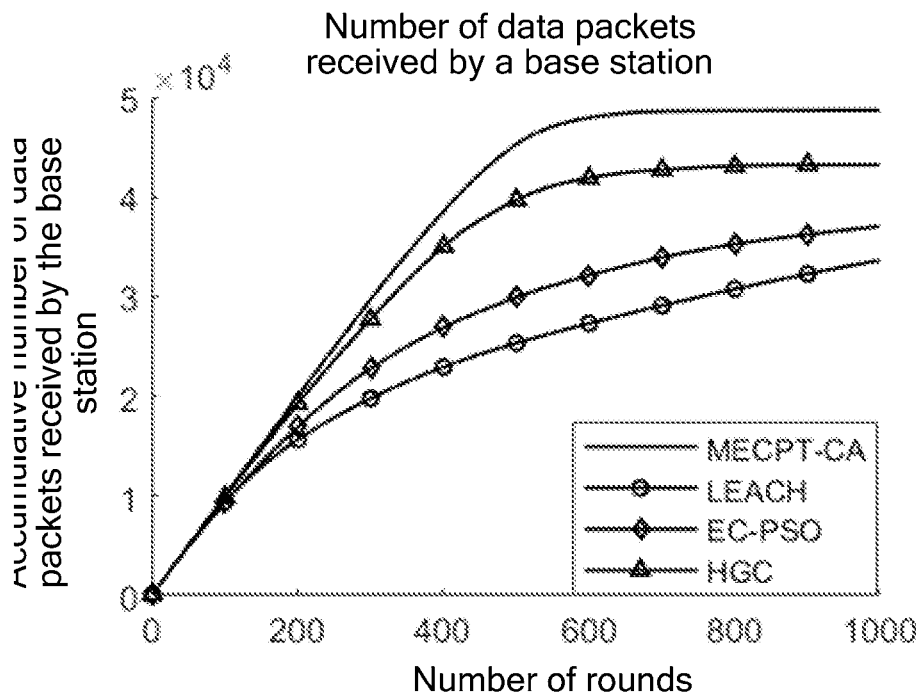
FIG. 8 is a schematic diagram of a relationship between network throughput and a number of rounds when a wireless sensor network runs for 1,000 rounds.

FIG. 8 is a schematic diagram of a relationship between a network throughput and the number of rounds when the wireless sensor network runs for 1,000 rounds in the above environment. It can be learned that the network throughput in the present disclosure is relatively large. Since the planning of communication routes among clusters in the network further considers the load and energy of the nodes, the energy distributed among the nodes in the network is balanced, such that the lifetime of the nodes is prolonged, and the network throughput is improved.

Figure 9:
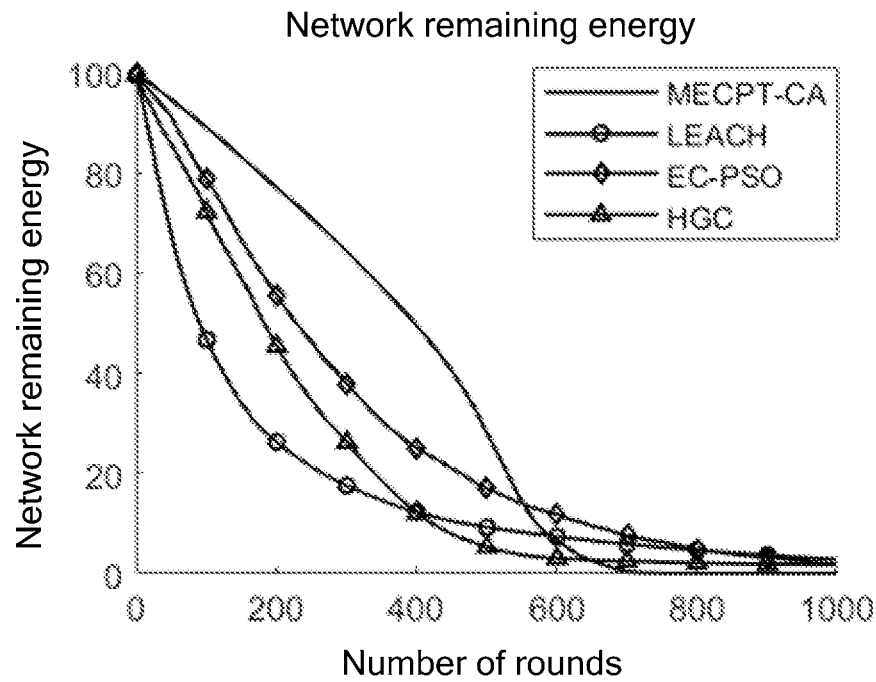
FIG. 9 is a schematic diagram of a relationship between network remaining energy and a number of rounds when a wireless sensor network runs for 1,000 rounds.

FIG. 9 is a schematic diagram of a relationship between network remaining energy and the number of rounds when the wireless sensor network runs for 1,000 rounds in the above environment. It can be learned that according to the present disclosure, actual communication distances of the cluster heads with a low centrality are reduced in the communication process between the nodes and the base station, and unnecessary energy consumption is reduced. Therefore, the network energy in the first 500 rounds is greater than that in the comparative algorithms, and the reduction speed of network energy consumption in the first 300 rounds in the present disclosure is lower than that in the comparative algorithms.

Figure 10:
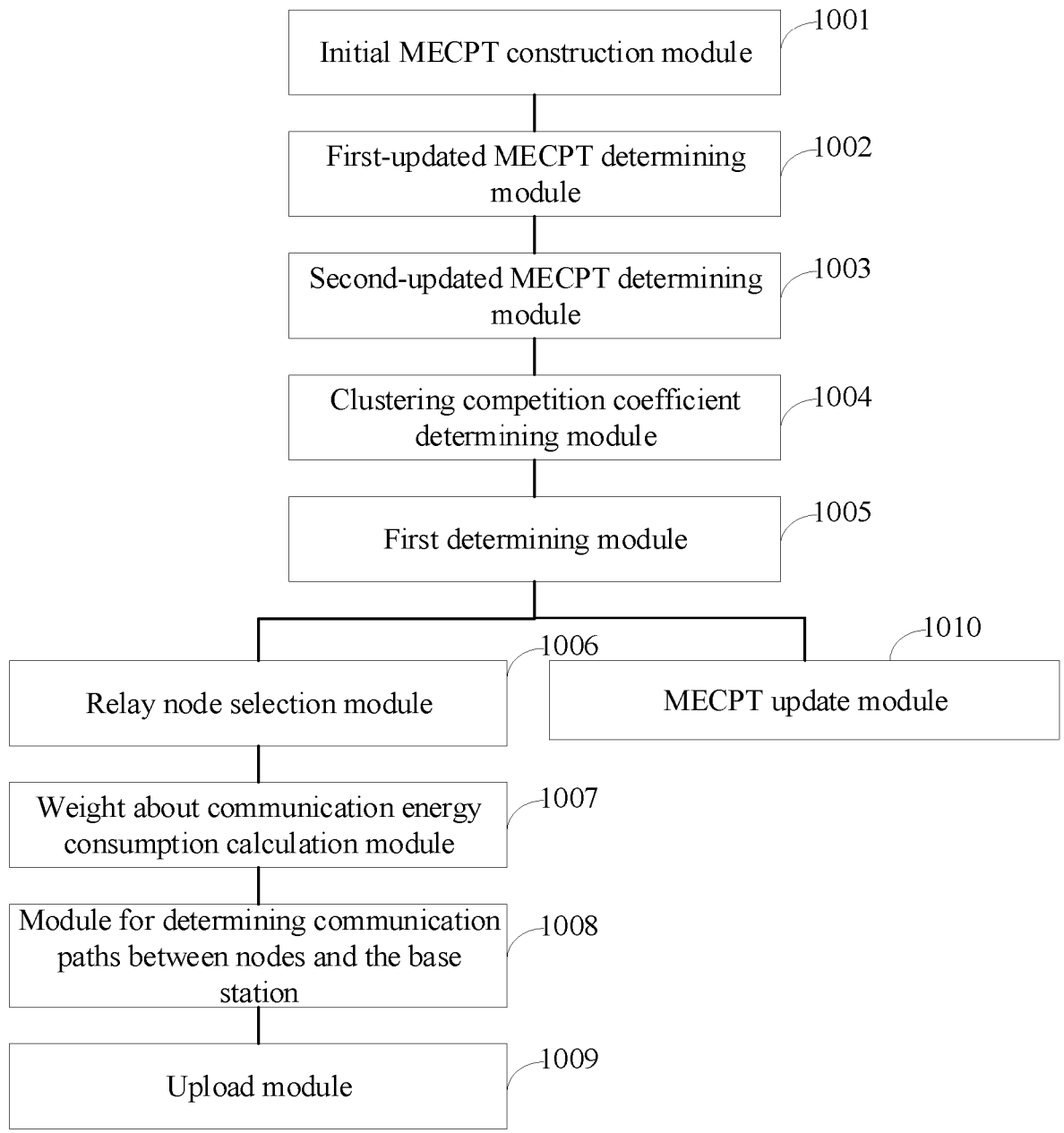
FIG. 10 is a schematic structural diagram of a clustering and routing system for a wireless sensor network according to the present disclosure.

FIG. 10 is a schematic structural diagram of a clustering and routing system for a wireless sensor network according to the present disclosure. As shown in FIG. 10, the clustering and routing system for a wireless sensor network includes:

An initial MECPT construction module 1001 is configured to: acquire, by a base station, node information in a wireless sensor network, and construct an initial MECPT based on the node information, where the node information includes node positions, node energy, and node IDs.

The initial MECPT construction module 1001 may specifically include: a first weight matrix generation unit, configured to: calculate weights of a connecting edges established by any two nodes based on the node information to generate a first weight matrix of the connecting edges; minimum weight communication paths calculation unit, configured to calculate minimum weight communication paths from alive nodes to the base station based on the first weight matrix of the connecting edges; and an initial MECPT construction unit, configured to: use next-hop nodes of the alive nodes as parent nodes of the alive nodes based on the minimum weight communication paths from the alive nodes to the base station to construct the initial MECPT with the base station as a root node.

A first-updated MECPT determining module 1002 is configured to: calculate first cluster head competition coefficients of nodes other than the base station in the current initial MECPT, perform a first batch of cluster head selection and node clustering, construct a first batch of cluster trees and update the current initial MECPT by a first iteration process, and get a first-updated MECPT.

A second-updated MECPT determining module 1003 is configured to: calculate second cluster head competition coefficients of nodes other than the base station in the first-updated MECPT, perform a second batch of cluster head selection and node clustering, construct a second batch of cluster trees and update the first-updated MECPT by a second iteration process, and get a second-updated MECPT.

A clustering competition coefficient determining module 1004 is configured to calculate, based on the first batch of cluster trees and the second batch of cluster trees, clustering competition coefficients of an existing cluster heads relative to nodes other than the base station in the second-updated MECPT.

A first determining module 1005 is configured to determine whether the clustering competition coefficients are all $-\infty$, to obtain a first determination result.

A relay node selection module 1006 is configured to: if the first determination result indicates that the clustering competition coefficients are all $-\infty$, enable non-clustered nodes to communicate with the base station following paths in the initial MECPT, and select child nodes of the base station in the initial MECPT as relay nodes.

A weight about communication energy consumption calculation module 1007 is configured to calculate weights about energy consumption of communication between the cluster heads and the relay nodes.

A module 1008 for determining communication paths between nodes and the base station, configured to: calculate minimum weight paths from the cluster heads to the base station based on the weights about energy consumption of communication, use the minimum weight paths as communication paths between the cluster heads and the base station, and determine the communication paths between the nodes and the base station based on the communication paths between the cluster heads and the base station.

An upload module 1009 is configured to determine that all nodes upload the node information to the base station following the communication paths between the nodes and the base station.

An MECPT update module 1010 is configured to: if the first determination result indicates that the clustering competition coefficients are not all $-\infty$, cluster the nodes in the second-updated MECPT based on the clustering competition coefficients, and each time a node in the second-updated MECPT is clustered, update the current second-updated MECPT and cluster tree to which the node in the second-updated MECPT is added.

The scale of wireless sensor networks is expanding, and the number and distribution range of wireless sensors in the network are also gradually expanding. The current clustering and routing methods are not suitable for large-scale wireless sensor networks. In view of the large-scale wireless sensor networks, the present disclosure proposes the clustering and routing method and system for a wireless sensor network, to alleviate the energy hole of the wireless sensor network, prolong the network lifetime, increase the network throughput, and reduce the network packet loss rate.

Each example of the present specification is described in a progressive manner, each example focuses on the difference from other examples, and the same and similar parts between the examples may refer to each other. Since the system disclosed in the embodiments corresponds to the method disclosed in the embodiments, the description is relatively simple, and reference can be made to the method descriptions.

In this specification, several specific embodiments are used for illustration of the principles and implementations of the present disclosure. The description of the foregoing embodiments is used to help illustrate the method of the present disclosure and the core ideas thereof. In addition, those of ordinary skill in the art can make various modifications in terms of specific implementations and the scope of application in accordance with the ideas of the present disclosure. In conclusion, the content of this specification shall not be construed as a limitation to the present disclosure.

What is claimed is:

1. A clustering and routing method for a wireless sensor network, comprising:
    acquiring, by a base station, node information in a wireless sensor network, and constructing an initial minimum-energy-consumption path tree (MECPT) based on the node information, wherein the node information comprises node positions, node energy, and node IDs;
    calculating first cluster head competition coefficients of nodes other than the base station in the current initial MECPT, performing a first batch of cluster head selection and node clustering, constructing a first batch of cluster trees and updating the current initial MECPT by a first iteration process, and getting a first-updated MECPT;
    calculating second cluster head competition coefficients of nodes other than the base station in the first-updated MECPT, performing a second batch of cluster head selection and node clustering, constructing second batch of cluster trees and updating the first-updated MECPT by a second iteration process, and getting a second-updated MECPT;
    calculating, based on the first batch of cluster trees and the second batch of cluster trees, clustering competition coefficients of an existing cluster heads relative to nodes other than the base station in the second-updated MECPT;
    determining whether the clustering competition coefficients are all $-\infty$, to obtain a first determination result;
    if the first determination result indicates that the clustering competition coefficients are not all $-\infty$, clustering the nodes in the current second-updated MECPT based on the clustering competition coefficients, and each time a node in the current second-updated MECPT is clustered, updating the current second-updated MECPT and the cluster tree to which the node in the second-updated MECPT is added, then back to the step "calculating, based on the first batch of cluster trees and the second batch of cluster trees";
    if the first determination result indicates that the clustering competition coefficients are all $-\infty$, enabling non-clustered nodes to communicate with the base station following paths in the initial MECPT, and selecting child nodes of the base station in the initial MECPT as relay nodes;
    calculating weights about energy consumption of communication between the cluster heads and the relay nodes;
    calculating minimum weight paths from the cluster heads to the base station based on the weights about energy consumption of communication, using the minimum weight paths as communication paths between the cluster heads and the base station, and getting communication paths between the nodes and the base station based on the communication paths between the cluster heads and the base station; and
    determining that all nodes upload the node information to the base station following the communication paths between the node and the base station.

2. The clustering and routing method for a wireless sensor network according to claim 1, wherein the acquiring, by a base station, node information in a wireless sensor network, and constructing an initial MECPT based on the node information comprises:
    calculating weights of connecting edges established by any two nodes based on the node information to generate a first weight matrix of the connecting edges;
    calculating minimum weight communication paths from alive nodes to the base station based on the first weight matrix of the connecting edges; and
    using next-hop nodes of the alive nodes as parent nodes of the alive nodes based on the minimum weight communication paths from the alive nodes to the base station to construct the initial MECPT with the base station as a root node.

3. The clustering and routing method for a wireless sensor network according to claim 1, wherein the calculating first cluster head competition coefficients of nodes other than the base station in the initial MECPT, performing a first batch of cluster head selection and node clustering, constructing a first batch of cluster trees and updating the initial MECPT by a first iteration process, and getting a first-updated MECPT, every iteration comprises:
    selecting, as a cluster head, a node corresponding to a maximum first cluster head competition coefficient within a cluster head competition coefficient threshold range;
    using, as a cluster tree, a subtree with the cluster head as a root node, and retaining communication paths in the cluster tree; and
    deleting nodes in the cluster tree and edges associated with the nodes from the current initial MECPT, and determining the first-updated MECPT.

4. The clustering and routing method for a wireless sensor network according to claim 3, wherein after the deleting nodes in the first batch of cluster trees and edges associated with the nodes from the current initial MECPT, and determining the first-updated MECPT, the method further comprises:
    if the maximum first cluster head competition coefficient is less than a lower limit of the cluster head competition coefficient threshold range, a number of selected cluster heads does not reach a cluster head number threshold, and non-clustered nodes still exists in the wireless sensor network, performing "calculating second cluster head competition coefficients of nodes other than the base station in the first-updated MECPT, performing a second batch of cluster head selection and node clustering, constructing a second batch of cluster trees and updating the current first-updated MECPT by a second iteration process, and getting a second-updated MECPT";
    if the number of selected cluster heads exceeds the cluster head number threshold and a non-clustered node still exists in the wireless sensor network, performing "calculating, based on the first batch of cluster trees and the second batch of cluster trees, clustering competition coefficients of an existing cluster heads relative to nodes other than the base station in the second-updated MECPT"; or if only the base station remains in the first-updated MECPT, performing "selecting child nodes of the base station in the initial MECPT as relay nodes".

5. The clustering and routing method for a wireless sensor network according to claim 1, wherein the calculating second cluster head competition coefficients of nodes other than the base station in the first-updated MECPT, performing a second batch of cluster heads selection and nodes clustering, constructing a second batch of cluster trees and updating the current first-updated MECPT by a second iteration process, and getting a second-updated MECPT comprises, every iteration comprises:

determining whether the second cluster head competition coefficients are all 0, to obtain a second determination result;

if the second determination result indicates that not all of the second cluster head competition coefficients are 0, selecting, as the cluster head, a node corresponding to a maximum second cluster head competition coefficient in the second cluster head competition coefficients;

using, as the cluster tree, a subtree with the cluster head as a root node, and retaining communication paths in the cluster tree; and deleting nodes in the cluster tree and edges associated with the nodes from the current first-updated MECPT, and determining the second-updated MECPT, and updating the second cluster competition coefficients then back to the step "determining whether the second cluster head competition coefficients are all 0; or if the second determination result indicates that the second cluster head competition coefficients are all 0, performing "calculating, based on the first batch of cluster trees and the second batch of cluster trees, clustering competition coefficients of an existing cluster heads relative to nodes other than the base station in the current second-updated MECPT".

6. The clustering and routing method for a wireless sensor network according to claim 5, wherein after the updating the current second-updated MECPT and cluster trees to which the node in the second-updated MECPT is added, the method further comprises:

obtaining an updated current MECPT; and if only the base station remains in the current MECPT, performing "selecting child nodes of the base station in the initial MECPT as relay nodes".

7. The clustering and routing method for a wireless sensor network according to claim 6, wherein the calculating minimum weight paths from the cluster heads to the base station based on the weights about energy consumption of communication, using the minimum weight paths as communication paths between the cluster heads and the base station, and determining a communication paths between the nodes and the base station based on the communication paths between the cluster heads and the base station comprises:

obtaining an estimated load values of the cluster heads or the relay nodes in a current routing state corresponding to difference between non-updated initial MECPT and the current MECPT;

calculating weights of connecting edges established by any two nodes in the current MECPT based on the estimated load values, to generate a second weight matrix of the connecting edges, wherein the nodes are cluster heads, relay nodes and base station in the current MECPT; and calculating minimum weight communication paths from each cluster heads to the base station based on the second weight matrix of the connecting edge.

8. The clustering and routing method for a wireless sensor network according to claim 1, wherein after the determining that all nodes upload the node information to the base station following the communication paths between the nodes and the base station, the method further comprises:

determining whether there is a cluster head or relay node whose energy is lower than an energy threshold, to obtain a third determination result, wherein the energy threshold is 50% of remaining energy of the node that uploads the node information to the base station in a previous round of node information transmission, wherein the nodes comprise cluster heads and relay nodes; and if the third determination result indicates that there is a cluster head or relay node whose energy is lower than the energy threshold, performing "acquiring, by a base station, node information in a wireless sensor network, and constructing an initial MECPT based on the node information"; or if the third determination result indicates that there is no cluster head or relay node whose energy is lower than the energy threshold, performing communication following communication paths between the nodes and the base station in the previous round of node information transmission.

* * * * *